(12) United States Patent
Hove et al.

(10) Patent No.: US 11,406,184 B2
(45) Date of Patent: Aug. 9, 2022

(54) SNAP LOCK SYSTEM, METHOD AND USE FOR CONNECTING CONSTRUCTION ELEMENTS

(71) Applicant: Humeneq AS, Oslo (NO)

(72) Inventors: Joakim Hove, Oslo (NO); Stian Tancred Langedal Unhjem, Oslo (NO)

(73) Assignee: Humeneq AS, Oslo (NO)

( * ) Notice: Subject to any disclaimer, the term of this patent is extended or adjusted under 35 U.S.C. 154(b) by 173 days.

(21) Appl. No.: 16/956,268

(22) PCT Filed: Dec. 21, 2018

(86) PCT No.: PCT/EP2018/086475
§ 371 (c)(1),
(2) Date: Jun. 19, 2020

(87) PCT Pub. No.: WO2019/122287
PCT Pub. Date: Jun. 27, 2019

(65) Prior Publication Data
US 2020/0390240 A1     Dec. 17, 2020

(30) Foreign Application Priority Data
Dec. 24, 2017   (NO) .................................. 20172047

(51) Int. Cl.
*E04F 11/00*     (2006.01)
*A47B 87/00*     (2006.01)
(Continued)

(52) U.S. Cl.
CPC .............. *A47B 87/002* (2013.01); *E04B 1/40* (2013.01); *E04B 1/6116* (2013.01); *E04F 11/09* (2013.01);
(Continued)

(58) Field of Classification Search
CPC ......... E04B 1/6116; E04B 1/40; A47B 87/002
See application file for complete search history.

(56) References Cited

U.S. PATENT DOCUMENTS

| 4,266,882 A | 5/1981 | Wilhelmi et al. |
| 4,956,956 A | 9/1990 | Maier et al. |

(Continued)

FOREIGN PATENT DOCUMENTS

| CN | 103502657 A | 1/2014 |
| CN | 105873475 A | 8/2016 |

(Continued)

OTHER PUBLICATIONS

Office Action in counterpart Chinese Patent Application No. 2018800819476 dated Jul. 6, 2021 (14 pages).
(Continued)

*Primary Examiner* — Basil S Katcheves
(74) *Attorney, Agent, or Firm* — Osha Bergman Watanabe & Burton LLP

(57) ABSTRACT

A snap lock system for connecting adjoining countertops comprises: a first locking unit comprising a first surface and an opposite second surface, the second surface being attachable to a first countertop, wherein the second surface has a profile comprising a projection, a first recess, and a second recess; a second locking unit comprising a first surface and an opposite second surface, the second surface being attachable to a second countertop, wherein the first surface has a profile comprising a projection and a recess; the second surface comprises a recess; and a third locking unit comprising a resilient member and a chamfered longitudinal edge, accommodated in a locking groove defined by the second recess of the first locking unit and the recess of the second locking unit. The profile of the second surface of the first locking unit is configured to receive the profile of the first surface of the second locking unit to provide a connec- (Continued)

tion preventing mutual horizontal movement between the first and second locking units. During connection of the first locking unit and the second locking unit, the third locking unit is configured to allow vertical mating of the first locking unit and the second locking unit and, after connection, the third locking unit is configured to prevent mutual vertical movement between the first locking unit and the second locking unit.

28 Claims, 10 Drawing Sheets

(51) Int. Cl.
    *E04B 1/41*     (2006.01)
    *E04B 1/61*     (2006.01)
    *E04F 11/09*     (2006.01)
    *F16B 5/00*     (2006.01)
    *E04F 13/08*     (2006.01)

(52) U.S. Cl.
    CPC ........ *F16B 5/0088* (2013.01); *E04F 13/0892* (2013.01)

(56) References Cited

U.S. PATENT DOCUMENTS

| | | | |
|---|---|---|---|
| 7,152,383 B1* | 12/2006 | Wilkinson, Jr. | ........ E04C 2/296 52/582.1 |
| 11,060,302 B2* | 7/2021 | Ylikangas | ............... E04F 15/04 |
| 2003/0070596 A1 | 4/2003 | Riach | |
| 2006/0101769 A1 | 5/2006 | Pervan et al. | |
| 2009/0064624 A1 | 3/2009 | Sokol | |
| 2009/0308014 A1* | 12/2009 | Muehlebach | ........... E04F 15/02 52/592.4 |
| 2011/0173914 A1* | 7/2011 | Engstrom | ......... E04F 15/02038 52/582.2 |
| 2012/0279161 A1 | 11/2012 | Hakansson et al. | |
| 2015/0300029 A1* | 10/2015 | Pervan | .............. E04F 15/02038 52/582.2 |
| 2016/0153200 A1* | 6/2016 | Pervan | .............. E04F 15/02038 52/582.2 |
| 2016/0340913 A1* | 11/2016 | Derelov | ................. A47B 47/00 |
| 2017/0089379 A1* | 3/2017 | Pervan | .................... F16B 12/24 |
| 2017/0328072 A1* | 11/2017 | Hannig | ................. E04F 15/105 |
| 2018/0001510 A1* | 1/2018 | Fransson | .............. B27G 13/005 |
| 2018/0002933 A1* | 1/2018 | Pervan | .............. E04F 15/02038 |
| 2019/0113061 A1 | 4/2019 | Hakansson et al. | |

FOREIGN PATENT DOCUMENTS

| | | |
|---|---|---|
| CN | 107002732 A | 8/2017 |
| CN | 108368866 A | 8/2018 |
| CN | 108471876 A | 8/2018 |
| CN | 110537030 A | 12/2019 |

OTHER PUBLICATIONS

International Search Report issued in PCT/EP2018/086475 dated Feb. 11, 2019 (5 pages).
Written Opinion of the International Searching Authority issued in PCT/EP2018/086475 dated Feb. 11, 2019 (8 pages).
Norwegian Search Report issued in No. 20172047 dated Jul. 24, 2018 (2 pages).

* cited by examiner

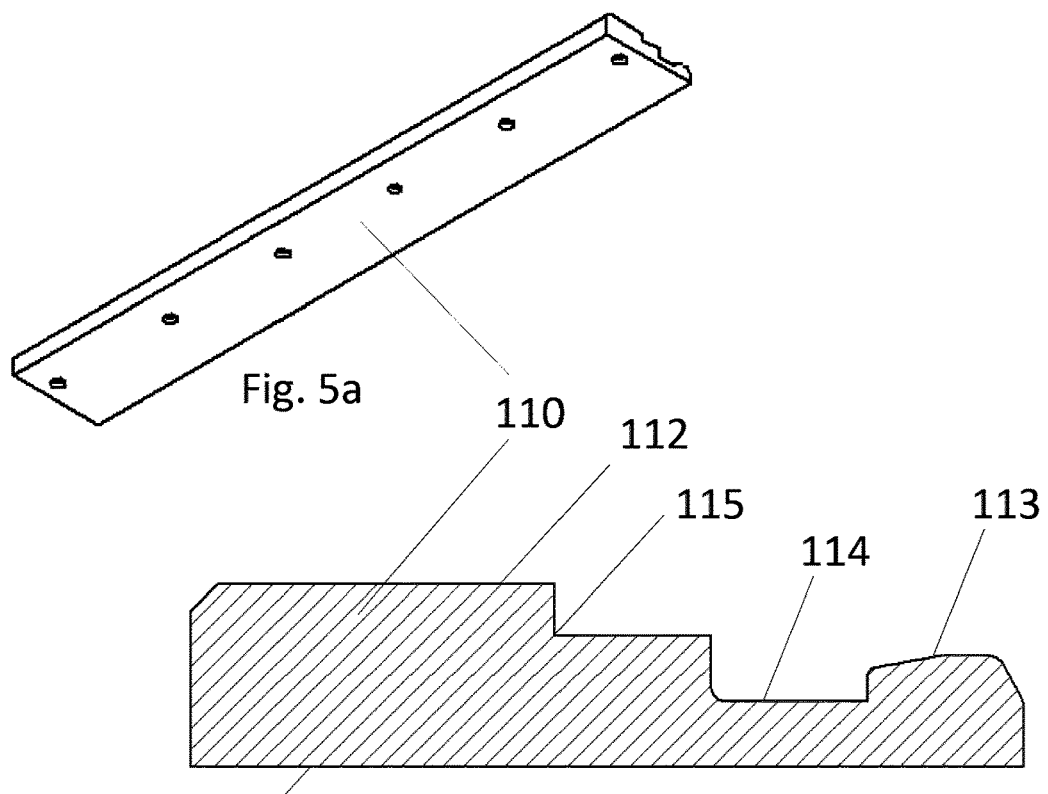
Fig. 5a
Fig. 5b
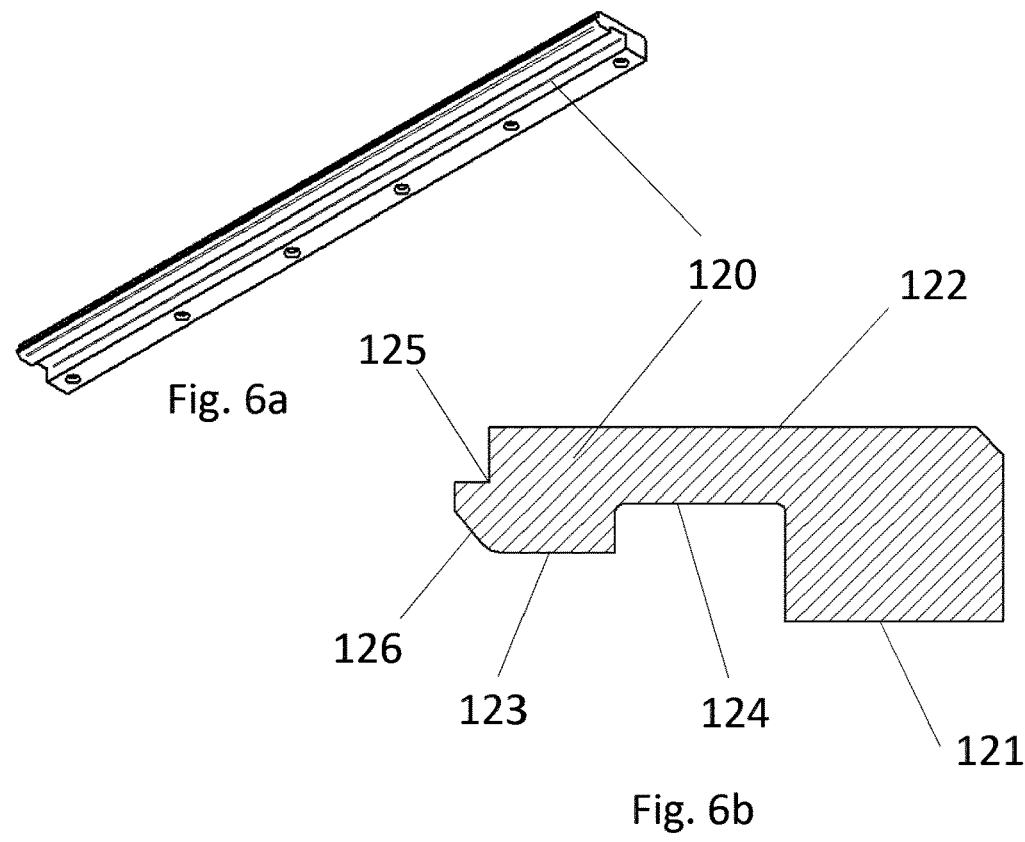
Fig. 6a
Fig. 6b

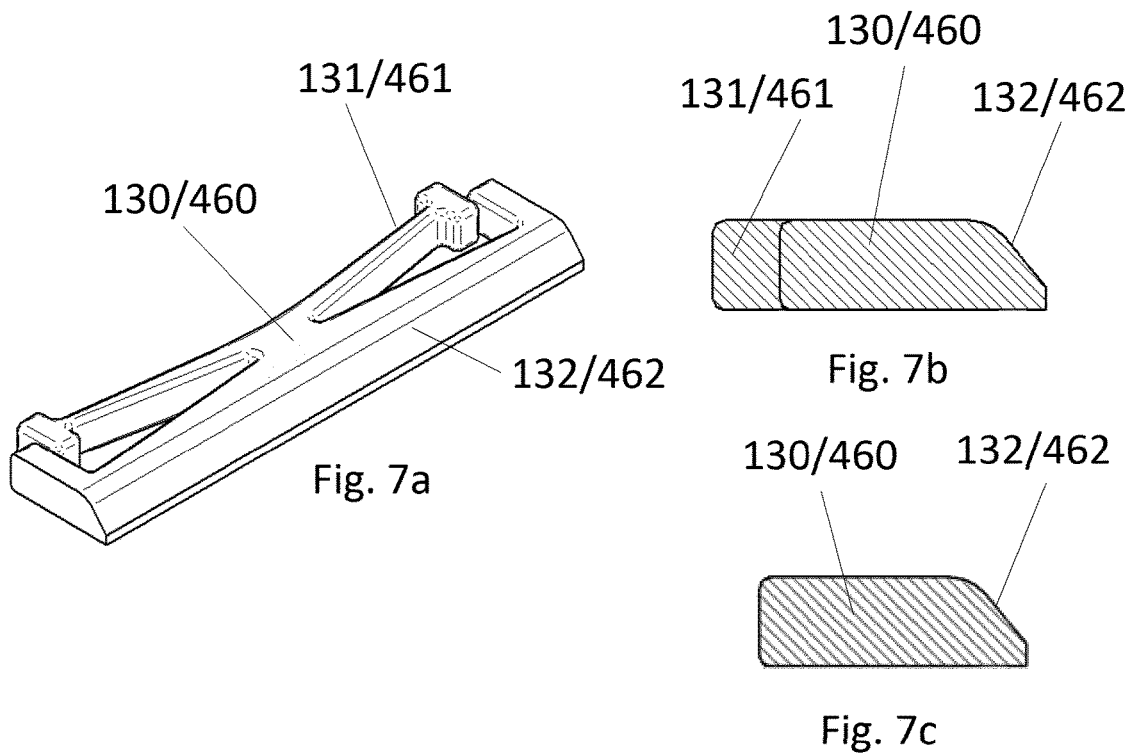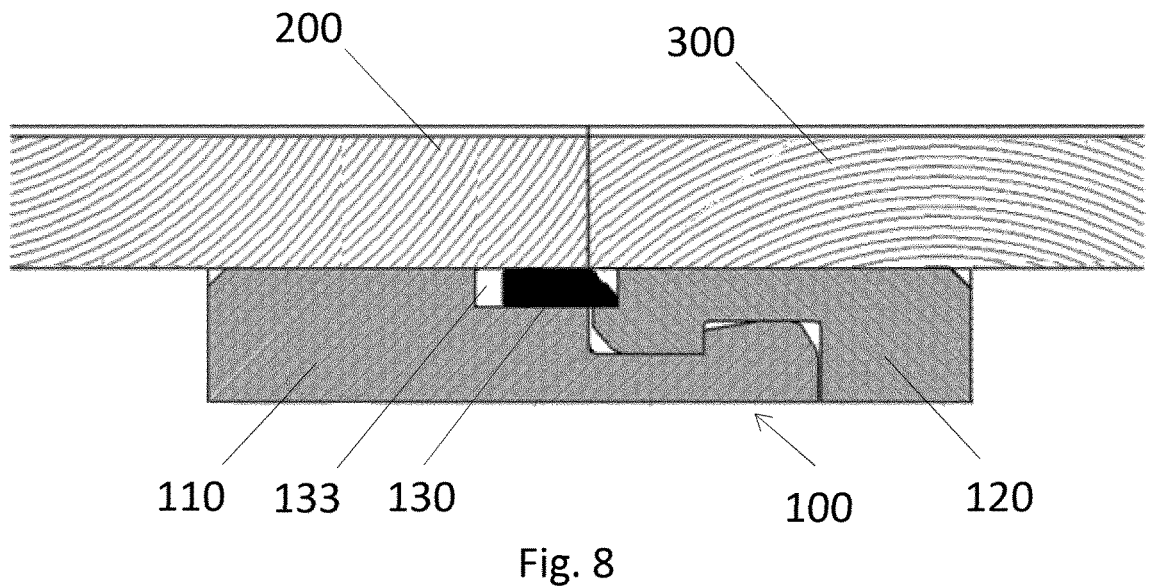

SNAP LOCK SYSTEM, METHOD AND USE FOR CONNECTING CONSTRUCTION ELEMENTS

TECHNICAL FIELD

The invention relates in general to a snap lock system and associated method and use for connecting e.g. countertops or other construction elements.

BACKGROUND

Countertops are horizontal work surfaces in kitchens, bathrooms, or workrooms in general, which are typically supported by cabinets. Depending on the layout, two or more countertops must often be joined together to form the complete work surface. Traditionally this is done by means of recessed slots in the underside of the countertops to be connected. With the slots of adjoining countertops aligned, a threaded bar is provided in the slots and a nut at each end is used to tighten the connection. The slots must preferably be made with small tolerances, which is time consuming. Installation is known to be cumbersome as the technician can only access the threaded bar from the underside of the countertops. The technician must thus enter the cabinet, in which space is limited and lighting is poor. Time is also lost if the cabinets must be emptied to get access.

Some of these issues are solved by the solution proposed by U.S. Pat. No. 4,266,882 A (Wilhelmi, J. B. et al.). Wilhelmi provides an alignment and fastening device, primarily intended for connection of table sections. A female member and a male member are attached to respective table sections and joined by a horizontal translating motion. The device is then held together by friction. This device can be attached to the underside of the countertops prior to installation; thus, eliminate the need for the technician to enter the cabinet. When connecting table sections there will always be sufficient space to perform the horizontal motion. This is not always the case when installing countertops. A horizontal joining motion is thus undesirable. The table section connection provided by Wilhelmi can be disconnected by applying a sufficient horizontal force. The possibility of disconnection is also desirable for countertops. However, countertops are not required to be disassembled as often as table sections, and countertops are also exposed to a rougher use. For countertops it is therefore beneficial to have a connection which cannot be disconnected by a horizontal force alone, as this may cause unintentional disconnection. When countertops are connected at single points, gaps may occur in their joining, especially after time and due to changes in humidity.

Some of these issues are in principle solved by the solution proposed by US 2006/101769 A1 (Pervan, D. et al.) even though it doesn't relate to countertops. Pervan disclose a mechanical locking mechanism for floor panels. Interlocking profiles are integrated in the edges of adjoining floor panels. Said profiles provide a connection restricting horizontal motion between the floor panels, which doesn't rely on friction. The profiles are housing a flexible tongue which allows the floor panels to be connected by a vertical motion. The flexible tongue will after connection restrict the vertical motion between the floor panels, also not relying on friction. Pervan also provides an elongated connection which will prevent gaps in the joining. However, the floor panels cannot have devices attached to their underside, as it would interfere with the base on which they are laid. Therefore, the interlocking profiles must be integrated in the edges of the floor panels. A big difference between floor panels and countertops is that none of the edges of the floor panels are visible after installation, whereas at least one of the edges of a countertop is visible after installation. I.e. the interlocking profiles cannot run the entire length of the countertop as they will be visible after installation. Producing interlocking profiles integrated in the edge of a countertop would therefor require milling or other means of machining in both the vertical and the horizontal direction, which is time consuming. For countertops made of brittle materials such as stone, providing profiles in the edges by means of machining is undesirable.

It is an objective of the present invention to provide a snap lock system for connecting adjoining countertops which are improved with regard to the above-mentioned prior art.

SUMMARY OF THE INVENTION

The invention provides a solution for connecting adjoining construction elements, such as countertops as set forth in the independent claims. Preferred embodiments are put forth in the dependent claims.

It is described a snap lock system for connecting adjoining countertops. The system comprises:
- a first locking unit comprising a first surface and an opposite second surface, the second surface being attachable to a first countertop, and wherein the second surface has a profile comprising a projection, a first recess and a second recess;
- a second locking unit comprising a first surface and an opposite second surface, the second surface being attachable to a second countertop,
  wherein the first surface has a profile comprising a projection and a recess, and
  wherein the second surface comprises a recess; and
- a third locking unit comprising a resilient member and a chamfered longitudinal edge, accommodated in a locking groove defined by the the second recess of the first locking unit and the recess of the second locking unit;

wherein the profile of the second surface of the first locking unit is configured to receive the profile of the first surface of the second locking unit to provide a connection preventing mutual horizontal movement between the first and second locking units; and wherein, during connection of the first locking unit and the second locking unit, the third locking unit is configured to allow vertical mating of the first locking unit and the second locking unit and, after connection, the third locking unit is configured to prevent mutual vertical movement between the first locking unit and the second locking unit.

It is thus provided an attachable snap lock system which may connect countertops without having to adapt the countertops.

A further advantage is that the locking units may be made by different materials than the countertops, thus materials which are cheaper and easier to manufacture can be selected.

A further advantage is that the snap lock system enables horizontal connection of countertops.

A further advantage is that the snap lock system provides a tight connection between the countertops over a longer distance, as compared to the pointwise connection of the prior art.

A further advantage is that the snap lock system leaves all visible side surfaces of the countertops intact.

The locking units may be manufactured in single pieces by efficient and cost-effective methods, such as extrusion, milling or molding.

The projection of the second locking unit comprises a chamfered corner which provides a smoother interaction with the third locking unit during mating of the first and second locking units.

The third locking unit may be made by molding of a polymer or a metal in order to achieve resilient properties.

By having a plain surface, the first locking unit provides a contact surface for attachment to the countertop.

The snap lock system may comprise a lever mechanism which enables easy disconnection. The lever mechanism comprises a lever handle and a lever wire. Where the lever wire connects the lever handle to the third locking unit. The lever mechanism is configured to retract the third locking unit to allow vertical movement between the first and second locking units after connection.

It is further described a countertop system comprising a first countertop, a second countertop and a snap lock system. Each countertop comprises an upper surface, a lower surface and four side surfaces.

The first and second locking units are preferably shorter than the side surfaces of the adjoining countertops which are in contact when the first and second locking units are connected. In this way the system will not be visible after assembly.

The countertops may comprise a recess configured to receive the first and second locking units. In this way the snap lock system will not protrude below the countertop.

It is further described to a method for connecting a first countertop with an adjoining second countertop by means of a snap lock system. This method provided an assembly procedure which, compared to the prior art, is less cumbersome for the technician. Each countertop comprises an upper surface, a lower surface and four side surfaces. The method comprises the steps of:
  aligning the first locking unit with the first countertop and the second locking unit with the second countertop in such a way that when the first locking unit and the second locking unit are connected, one of the side surfaces of the first countertop is in contact with one of the side surfaces of the second countertop;
  attaching the first locking unit to the first countertop in the aligned position and attaching the second locking unit to the second countertop in the aligned position;
  providing the third locking unit in the locking groove; and
  vertically connecting the first and second locking units.

To avoid the snap lock system from protruding below the countertop, the method may further comprise the initial steps of:
  providing a recess on the first countertop, configured to receive the first locking unit; and
  providing a recess on the second countertop, configured to receive the second locking unit.

To ease the alignment of the lock units with the countertops, the method may further comprise the step of:
  dimensioning the recesses in such a way that they horizontally and/or vertically align the first and second locking units with their respective first and second countertops.

It is further described the use of a snap lock system for connecting construction elements of a framework or a truss to provide a safer and easier erection.

It is further described a snap lock system for connecting perpendicularly adjoining countertops, wherein the system comprises: a fourth locking unit comprising a first surface and an opposite second surface, the second surface being attachable to a first countertop, and wherein the second surface has a profile comprising a recess; a fifth locking unit comprising an end portion, a first surface and an opposite second surface, wherein the end portion is adapted to be received in a recess of the first countertop, the second surface has a profile comprising a recess, the first surface being attachable to a second countertop; a sixth locking unit comprising a resilient member and a chamfered longitudinal edge, accommodated in a locking groove defined by the recess of the fourth locking unit and the recess of the fifth locking unit; and wherein the end portion of the fifth locking unit is configured to prevent mutual horizontal movement between the first countertop and the fifth locking unit, when received in the recess of the first countertop; and wherein, during connection of the fourth locking unit and the fifth locking unit, the sixth locking unit is configured to allow vertical mating of the fourth locking unit and the fifth locking unit and, after connection, the sixth locking unit is configured to prevent mutual vertical movement between the fourth locking unit and the fifth locking unit.

The snap lock system wherein each of the fourth locking unit, the fifth locking unit and the sixth locking unit are manufactured in single pieces.

The snap lock system wherein the projection of the second locking unit comprises a chamfered corner.

The snap lock system wherein the sixth locking unit is made of a polymer or a metal.

The snap lock system wherein the first surface of the first locking unit is plain.

The snap lock system wherein the snap lock system further comprises a lever mechanism comprising:
  a lever handle; and
  a lever wire connecting the lever handle to the third locking unit;
wherein the lever mechanism is configured to retract the sixth locking unit to allow vertical movement between the fourth and fifth locking units after connection.

It is further described a countertop system comprising:
  a first countertop;
  a second countertop; and
  a snap lock system.

The countertop system wherein each countertop comprises an upper surface, a lower surface and four side surfaces, and the fourth and fifth locking units are shorter than the side surfaces of the adjoining countertops which are in contact when the fourth and fifth locking units are connected.

The countertop system wherein each countertop comprises a recess configured to receive the fourth and fifth locking units.

It is further described a method for connecting a first countertop with an adjoining second countertop by means of a snap lock system, wherein each countertop comprises an upper surface, a lower surface and four side surfaces, wherein the method comprises the steps of:
  aligning the first locking unit with the first countertop and the second locking unit with the second countertop in such a way that when the first locking unit and the second locking unit are connected, the lower surface of the first countertop is in contact with one of the side surfaces of the second countertop;
  attaching the fourth locking unit to the first countertop in the aligned position and attaching the fifth locking unit to the second countertop in the aligned position;
  providing the sixth locking unit in the locking groove; and
  vertically connecting the fourth and fifth locking units.

The method may further comprise the initial steps of:
  providing a recess on the first countertop, configured to receive the fourth locking unit; and providing a recess on the second countertop, configured to receive the fifth locking unit.

The method may further comprise the step of:

dimensioning the recesses in such a way that they horizontally and/or vertically align the fourth and fifth locking units with their respective first and second countertops.

It is further described the use of a snap lock system for connecting construction elements of a framework or a truss or panel boards.

It is further described the use of a snap lock system for connecting board joints of furniture or steps.

BRIEF DESCRIPTION OF FIGURES

The invention will now be described with reference to the exemplifying embodiments shown in the accompanying drawings, wherein:

FIG. 5a shows a perspective view of a first locking unit of the present invention, FIG. 5b shows a cross-section of a first locking unit of the present invention, FIG. 6a shows a perspective view of a second locking unit of the present invention, FIG. 6b shows a cross-section of a second locking unit of the present invention, FIG. 7a shows a perspective view of a third locking unit of the present invention, FIG. 7b shows a cross-section of a third locking unit of the present invention in an expanded state, FIG. 7c shows a cross-section of a third locking unit of the present invention in a compressed state, FIG. 8 shows a cross-section of two countertops connected by means of the present invention.

DETAILED DESCRIPTION

In the following exemplifying embodiments, the present invention will be described when applied to a countertop. However, the present invention is equally applicable for any board joint or other construction element. The present invention is applicable for furniture such as tables, desks, cabinets, beds, chairs, sofas, and so on. The present invention is also applicable for steps, panel boards, façade elements, etc. The present invention is also applicable as a preliminary connection during certain erection phases, for instance during tower-assembly of components and/or building blocks, which enables the next building block to be safely assembled while the previous are permanently connected by bolts or welding a second fitter team.

Figure 1:
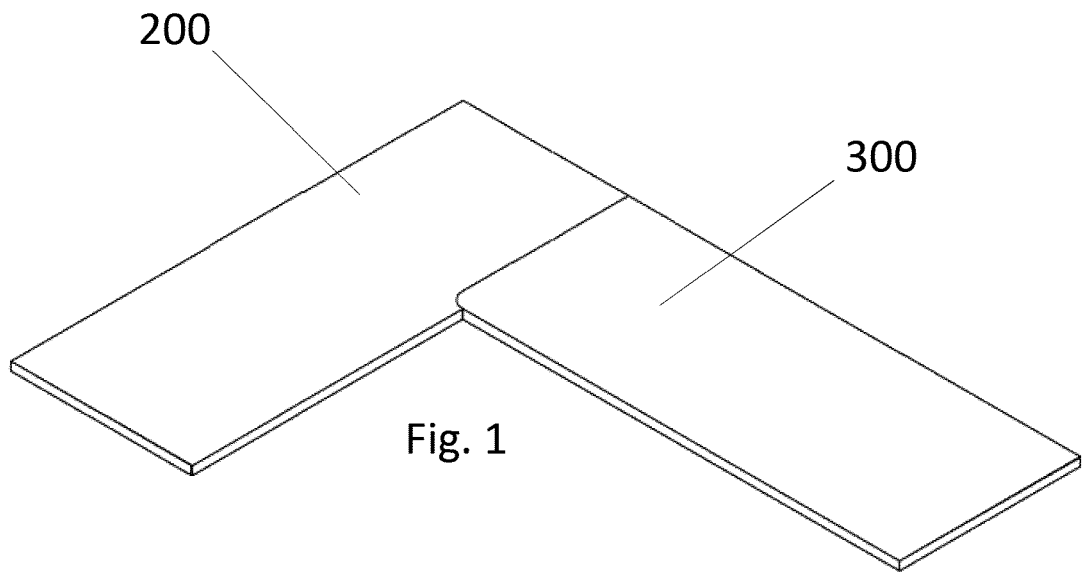
FIG. 1 shows a perspective view of two adjoining countertops.

FIG. 1 shows two connected countertops 200, 300. The countertops 200, 300 of FIG. 1 are oriented in the same plane and form an L-shape. Other configurations are also common such as I-shape, U-shape, 45 degrees angle connections and even connection of countertops 200, 300 oriented in perpendicular planes.

Figure 2:
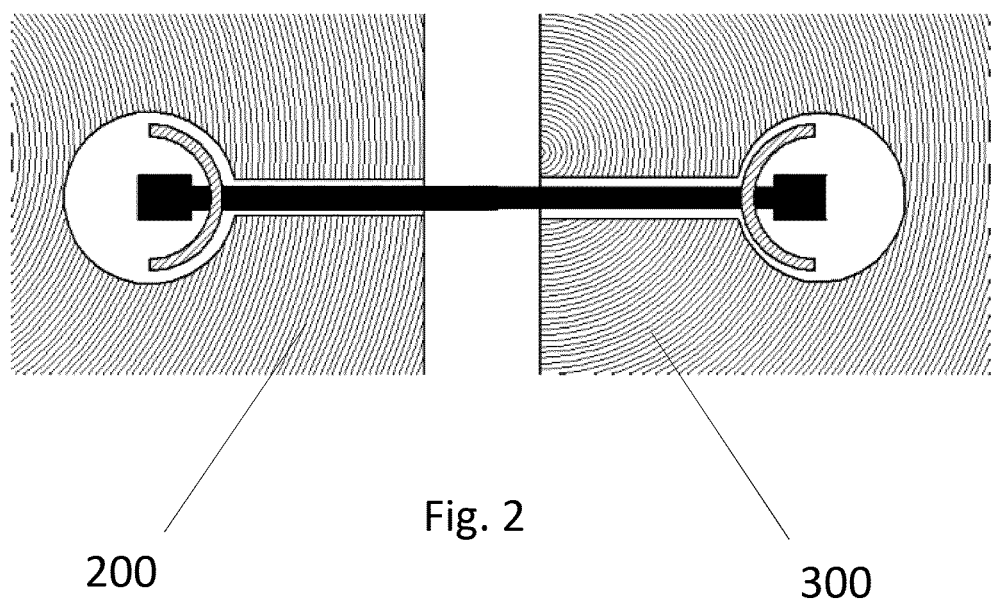
FIG. 2 shows connecting means of the prior art.

FIG. 2 shows how two adjoining countertops 200, 300 traditionally are connected. A groove and a circular portion must be milled out in each countertop 200, 300. A threaded bar with a washer and a nut at each end are inserted in the aligned grooves. By tightening the nuts, the countertops are connected by means of friction.

Figure 3:
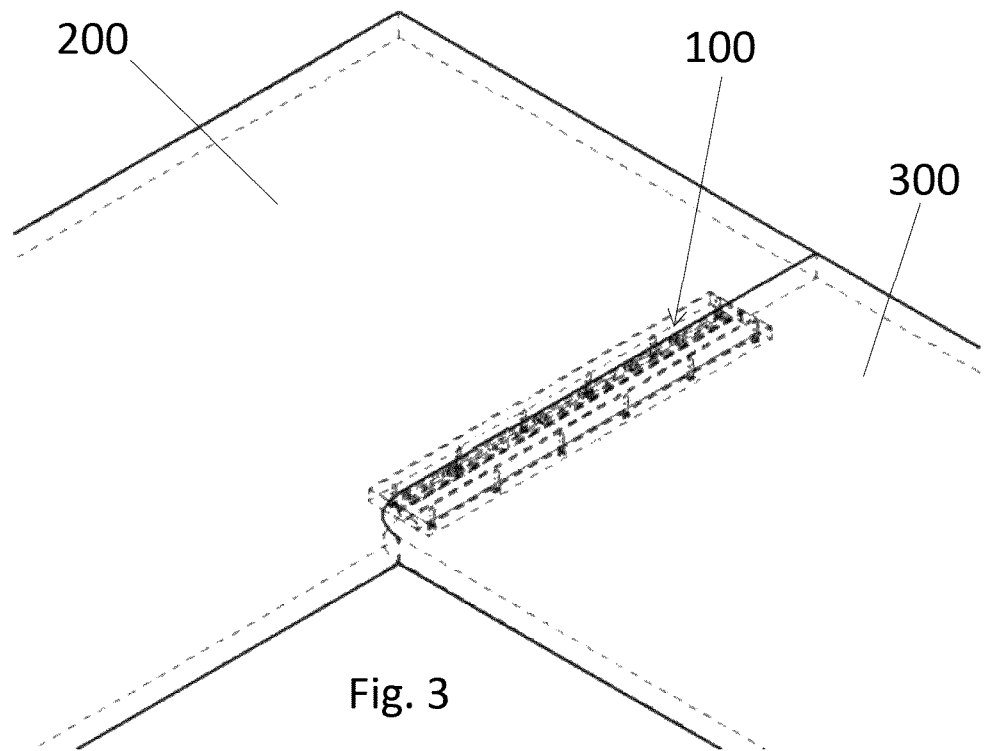
FIG. 3 shows two countertops connected by means of the present invention.

FIG. 3 shows two countertops 200, 300 connected by means of a snap lock system 100 according to one embodiment the present invention. The snap lock system 100 is attachable to the countertops 200, 300, preferably the lower surface of the countertop 200, 300. No adaption of the countertops 200, 300, as with the system of FIG. 2, is required for the attachment of the snap lock system 100. The snap lock system 100 can be attached to the countertop 200, 300 by a variety of fastening means, e.g. screws, nails or adhesive. Attachment of the snap lock system 100 is possible regardless of the material of the countertops 200, 300. The countertops may e.g. be made of wood, MDF, stone, concrete, composite, etc.

The snap lock system 100 has a length which is shorter than the contacting side surfaces of the adjoining countertops 200, 300. The snap lock system 100 is arranged at a distance from each longitudinal end of the contacting side surfaces of the adjoining countertops 200, 300. The snap lock system 100 is longitudinally arranged in parallel with the contacting side surfaces of the adjoining countertops 200, 300. A longer snap lock system 100 will provide a tighter connection than a shorter snap lock system 100. One snap lock system 100 covering most of the length of the contacting surfaces of the two adjoining countertops 200, 300 is preferred, however, several snap lock systems 100 may be arranged in series.

Figure 4:
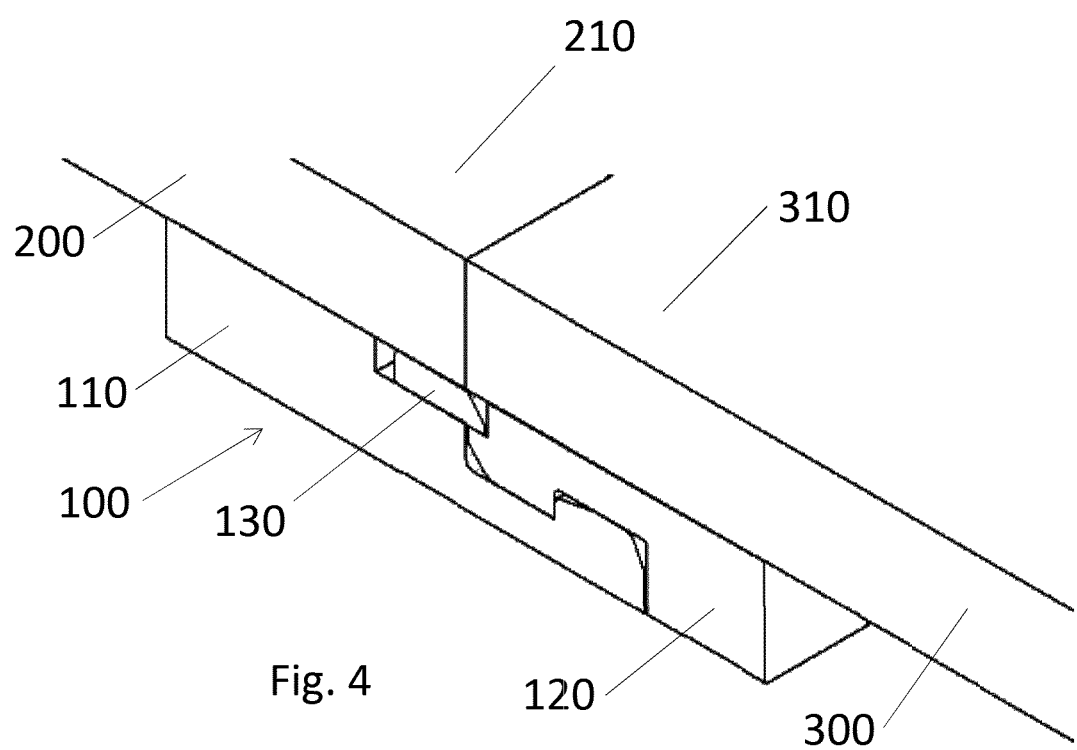
FIG. 4 shows a cross-section of two countertops connected by means of the present invention.

FIG. 4 shows a cross-section through the two countertops 200, 300 and the snap lock system 100 as shown in FIG. 3. The snap lock system 100 is in a connected state in FIG. 4. The snap lock system 100 comprises a first locking unit 110, a second locking unit 120 and a third locking unit 130. The first locking unit 110 is attached to the first countertop 200. The second locking unit 120 is attached to the second countertop 300. The third locking unit 130 is accommodated between the first and second locking units 110, 120. In the connected state as shown in FIG. 4, the first and second locking units 110, 120 are providing a connection preventing mutual horizontal movement between the first and second locking units 110, 120. In the connected state as shown in FIG. 4, the first and second locking units 110, 120 are providing a connection preventing mutual horizontal movement between the first and second countertops 200, 300. In the connected state as shown in FIG. 4, the first, second and third locking units 110, 120, 130 are providing a connection preventing mutual vertical movement between the first, second and third locking units 110, 120, 130. In the connected state as shown in FIG. 4, the first, second and third locking units 110, 120, 130 are providing a connection preventing mutual vertical movement between the first and second countertops 200, 300.

FIG. 5*a* shows a perspective view of the first locking unit 110.

FIG. 5*b* shows a transverse cross-section through the first locking unit 110. The first locking unit 110 has a first surface 111. The first surface 111 of the first locking unit 110 is plain. The first locking unit 110 has a second surface 112. The second surface 112 of the first locking unit 110 is suitable for being attached to a countertop 200, 300. The second surface 112 of the first locking unit 110 is profiled. The profile of the second surface 112 of the first locking unit 110 comprises a projection 113, a first recess 114 and a second recess 115. The depth of the recesses 114, 115 being defined in the direction from the first to the second surface 111, 112 of the first locking unit 110. The first recess 114 of the first locking unit 110 being deeper than the second recess 115 of the first locking unit 110. When seen in cross-section, the first recess 114 is arranged between the second recess 115 and the projection 113 of the first locking unit 110. The width of the second recess 115 may correspond to the depth of the third locking unit 130 in a compressed state. The width of the second recess 115 may correspond to the difference in depth of the third locking unit 130 in a compressed state and in an expanded state.

FIG. 6*a* shows a perspective view of the second locking unit 120.

FIG. 6*b* shows a transverse cross-section through the second locking unit 120. The second locking unit 120 has a first surface 121. The first surface 121 of the second locking unit 120 is profiled. The profile of the first surface 121 of the second locking unit 120 comprises a projection 123 and a first recess 124. The projection 123 has a chamfered corner 126. The second locking unit 120 has a second surface 122. The second surface 122 of the second locking unit 120 is suitable for being attached to a countertop 200, 300. The second surface 122 of the second locking unit 120 has a second recess 125. The width of the second recess 125 may correspond to the depth of the third locking unit 130 in a compressed state. The width of the second recess 125 may correspond to the difference in depth of the third locking unit 130 in a compressed state and in an expanded state.

The profile of the second surface 112 of the first locking unit 110 is configured to receive the profile of the first surface 121 of the second locking unit 120 to form a connection. When the first and second locking units 110, 120 are connected, the projection 113 of the first locking unit 110 enters the first recess 124 of the second locking unit 120 in a tight fit. When the first and second locking units 110, 120 are connected, the projection 123 of the second locking unit 120 enters the first recess 114 of the first locking unit 110 in a tight fit. When the first and second locking units 110, 120 are connected, the second recesses 115, 125 of the first and second locking units 110, 120 align.

The mutual horizontal movement between the first and second locking units 110, 120 is prevented when the profiled first surface 121 of the second locking unit 120 is received by the profiled second surface 112 of the first locking unit 110. When the projection 113 of the first locking unit 110 is entered in the first recess 124 of the second locking unit 120, horizontal movement is prevented between the first and second locking units 110, 120. When the projection 123 of the second locking unit 120 is entered in the first recess 114 of the first locking unit 110, horizontal movement is prevented between the first and second locking units 110, 120.

The first and second locking units 110, 120 may be efficiently manufactured in single pieces by milling, extruding or molding. A non-exhaustive list of suitable materials for the manufacturing of the first and second locking units 110, 120 are wood, MDF, polymers and metals.

FIG. 7*a* shows a perspective view of the third locking unit 130. The third locking unit 130 has a chamfered longitudinal edge 132. The chamfered longitudinal edge 132 is configured to cooperated with the chamfered corner 126 of the second locking unit 120 during connection of the first and second locking units 110, 120. The third locking unit 130 has a resilient member 131. The chamfered longitudinal edge 132 may be opposite the resilient member 131. When no force is applied to the resilient member 131, the third locking unit 130 is in an expanded state. When sufficient force is applied to the resilient member 131, the third locking unit 130 enters a compressed state. The resilient member 130 may comprise a helical spring, a leaf spring, a disc spring, a torsion spring, a conical spring or similar.

FIG. 7*b* and FIG. 7*c* show cross-sections of the third locking unit 130 in the expanded state and the compressed state, respectively.

The third locking unit 130 may be fabricated by molding. The third locking unit 130 may be a single piece or an assembly. The third locking unit may be produced by a polymer or a metal.

FIG. 8 shows a cross-section of the two countertops 200, 300 connected by means of the snap lock system 100. The third locking unit 130 is accommodated in a locking groove 133 formed by the second recesses 115, 125 of the first and second locking units 110, 120.

The first locking unit 110 is aligned with the first countertop 200 before they are attached, as shown in FIG. 8. A side surface of the first countertop 200 is aligned with a side surface of the first recess 114 of the first locking unit 110. The second locking unit 120 is aligned with the second countertop 300 before they are attached, as also shown in FIG. 8. A side surface of the second countertop 300 is aligned with a side surface of the second locking unit 120. When the first locking unit 110 is attached to the first countertop 200, the second locking unit 120 is attached to the second countertop 300, and the third locking unit 130 is arranged in the locking groove 133, the countertops 200, 300 can be connected. The first countertop 200 with the first locking unit 110 attached and the third locking unit 130 arranged therebetween can be positioned at the place of installation or in a test stand. Then the second countertop 300 with the second locking unit 120 attached can be vertically lowered into connection with the first countertop 200 with the first locking unit 110 attached. The second countertop 300 may be kept level or tilted during connection. When the chamfered corner 126 of the second locking unit 120 engages the chamfered longitudinal edge 132 of the third locking unit 130, the vertical movement will provide a horizontal force on the resilient member 131, causing the third locking unit 130 to shift into the compressed state. With the third locking unit 130 in the compressed state, the projection 123 of the second locking unit 120 is allowed to enter the first recess 114 of the first locking unit 110. When the projection 123 of the second locking unit 120 has entered the first recess 114 of the first locking unit 110, the second recesses 115, 125 of the first and second locking units 110, 120 will align. When the second recesses 115, 125 of the first and second locking units 110, 120 are aligned, the third locking unit 130 is allowed to shift back into its expanded state. The countertops 200, 300 are then connected. If the countertops 200, 300 and the first and second locking units 110, 120 are correctly aligned, the side surfaces of the countertops 200, 300 will be tightly connected. If the countertops 200, 300 have the same thickness, their top surfaces will be aligned when in the connected state. After entry into the connected state, the interfacing surfaces of the third locking unit 130 and the second locking unit 120 are both plain; thus, a horizontal force cannot be provided to the third locking unit 130 as a result of vertical movement of the second locking unit 120.

The third locking unit 130 may be oriented to engage the first countertop 200 during connection, instead of the second locking unit 120.

Figure 9:
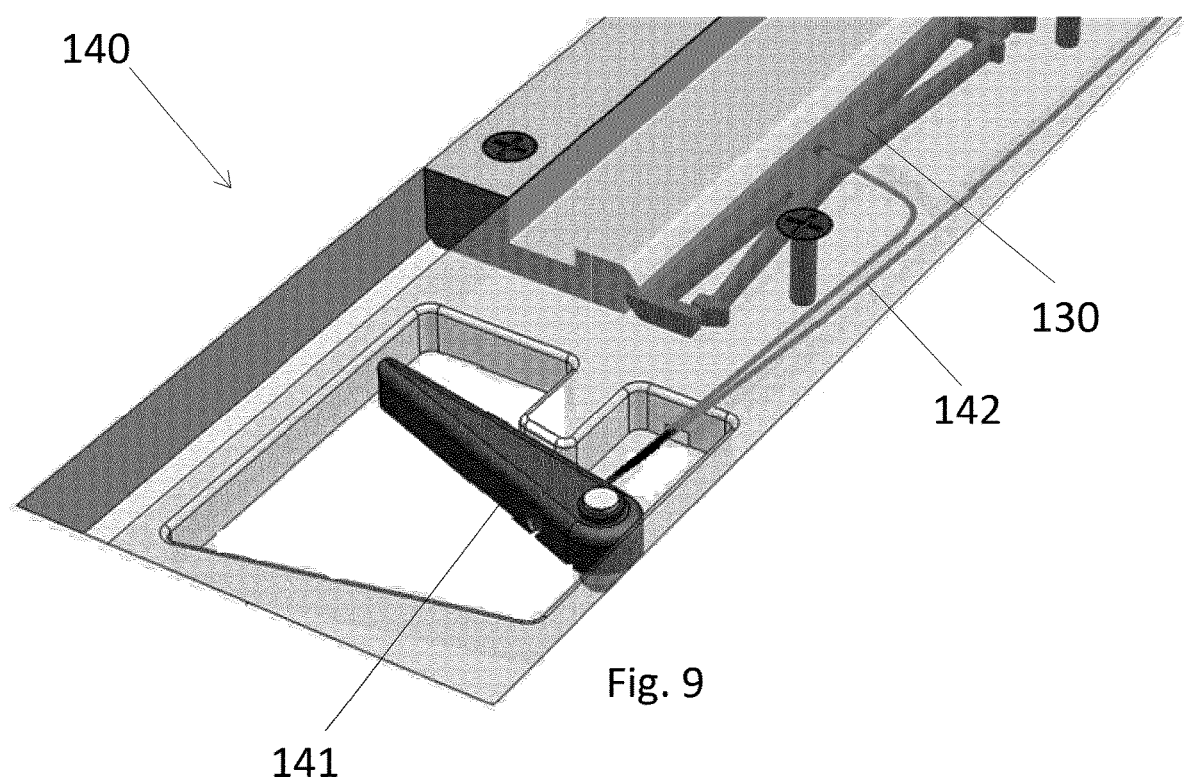
FIG. 9 shows a perspective view of a lever mechanism of the present invention.

FIG. 9 shows a perspective view of a level mechanism 140. The lever mechanism may be part of the snap lock system 100. The lever mechanism 140 provides the possibility of shifting the third locking unit 130 into the compressed state and thus disconnect the countertops 200, 300. The lever mechanism comprises a lever handle 141 and a lever wire 142. The lever wire 142 connects the lever handle 141 and the third locking unit 130 (alternatively a series of third locking units 130). The lever mechanism 140 is arranged in such a way that by pulling the lever handle 141, a horizontal force is applied to the third locking unit 130, shifting it into the compressed state. The lever handle may be pivotably attached to the first or second countertop 200, 300 or the first locking unit 110.

If the first and second locking units 110, 120 are attached by means of screws, a way to disconnect the countertops 200, 300 is to unscrew one of the first or second locking units 110, 120. One of the countertops 200, 300 can then be lifted away for the other.

If the short side surface of the third locking unit 130 can be reached, another way of disconnecting the countertops 200, 300 is to push it sideways out of the locking groove 133. This method requires that there is sufficient space on the opposite side for the third locking unit 130 to completely exit the locking groove 133. One of the countertops 200, 300 can then be lifted away for the other.

Figure 10:
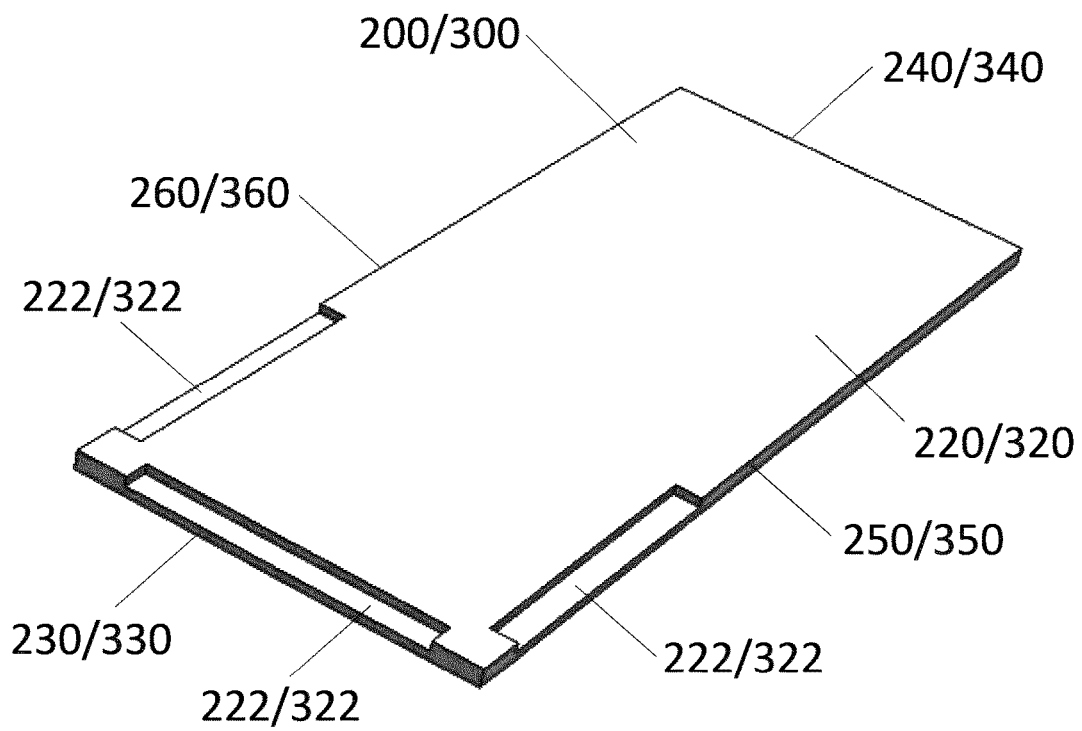
FIG. 10 shows a perspective view of an adapted countertop.

FIG. 10 shows a perspective view of a countertop 200, 300. The countertop 200, 300, has a lower surface 220, 320, an upper surface 210, 310, a first side surface 230, 330, a second side surface 240, 340, a third side surface 250, 350 and a fourth side surface 260, 360. The snap lock system 100 should be attached to the lower surface 220, 320 of the countertops 200, 300. The lower surface 220, 320 of the countertops 200, 300 will often be a plain surface 221, 321. However, the lower surface 220, 320 may be provided with a recess 222, 322 which is configured to receive the first or second locking unit 110, 120. Depending on how the countertops 200, 300 are to be joined, the recess 222, 322 may be provided at any side surface 230, 330, 240, 340, 250, 350, 260, 360 of the countertops 200, 300. If the snap lock system 100 is to be arranged in a recess 222, 322, each countertop 200, 300 to be connected should be provided with a recess 222, 322. The recesses 222, 322 of adjoining countertops 200, 300 should preferably be mirror symmetric. In the example of FIG. 10 the countertop 200, 300 is provided with three recesses 222, 322 to illustrated typical positions and dimensions of recesses 222, 322. With three recesses 222, 322 as illustrated, the countertop 200, 300 is adapted to connection with three other countertops 200, 300.

Figure 11:
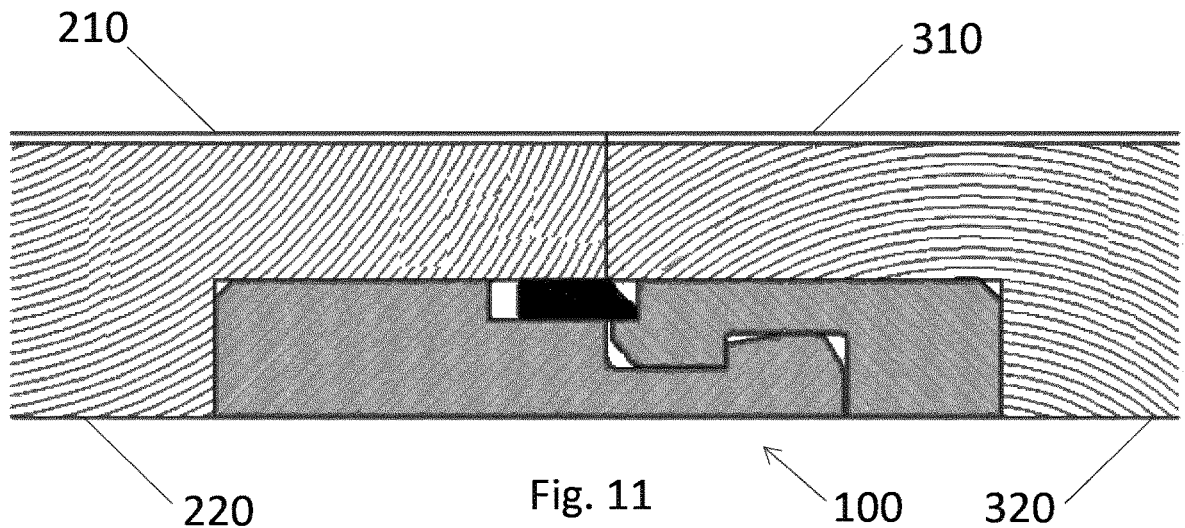
FIG. 11 shows a cross-section of two adapted countertops connected by means of the present invention.

FIG. 11 shows a cross-section of countertops 200, 300 connected by means of the snap lock system 100, wherein the snap lock system is received in recesses 222, 322 in the lower surfaces 220, 320 of the countertops 200, 300. The recesses 222, 322 may be dimensioned in such a way that the first surface 111 of the first locking unit 110 aligns with the lower surface 220 of the first countertop 200, and the first surface 121 of the second locking unit 120 aligns with the lower surface 320 of the second countertop 300. The recesses 222, 322 may be dimensioned in such a way that they horizontally align the first and second locking units 110, 120 with their respective first and second countertops 200, 300.

Figure 12A:
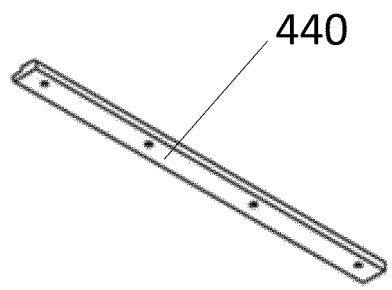
FIG. 12a shows a perspective view of a fourth locking unit of the present invention.

FIG. 12a shows a perspective view of a fourth locking unit 440.

Figure 12B:
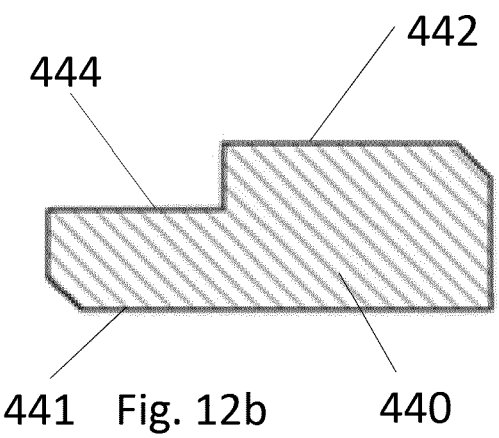
FIG. 12b shows a cross-section of a fourth locking unit of the present invention.

FIG. 12b shows a transverse cross-section through the fourth locking unit 440. The first fourth locking unit 440 has a first surface 441. The first surface 441 of the fourth locking unit 440 is plain. The fourth locking unit 440 has a second surface 442. The second surface 442 of the fourth locking unit 440 is suitable for being attached to a countertop 200, 300. The second surface 442 of the fourth locking unit 440 is profiled. The profile of the second surface 442 of the fourth locking unit 440 comprises a recess 444. The depth of the recess 444 being defined in the direction from the first to the second surface 441, 442 of the fourth locking unit 440. The width of the recess 444 may correspond to the depth of the sixth locking unit 460 in a compressed state. The width of the recess 444 may correspond to the difference in depth of the sixth locking unit 460 in a compressed state and in an expanded state.

Figure 13A:
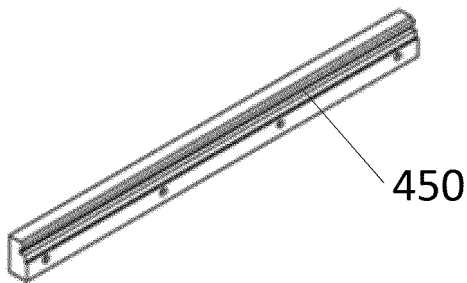
FIG. 13a shows a perspective view of a fifth locking unit of the present invention.

FIG. 13a shows a perspective view of the fifth locking unit 450.

Figure 13B:
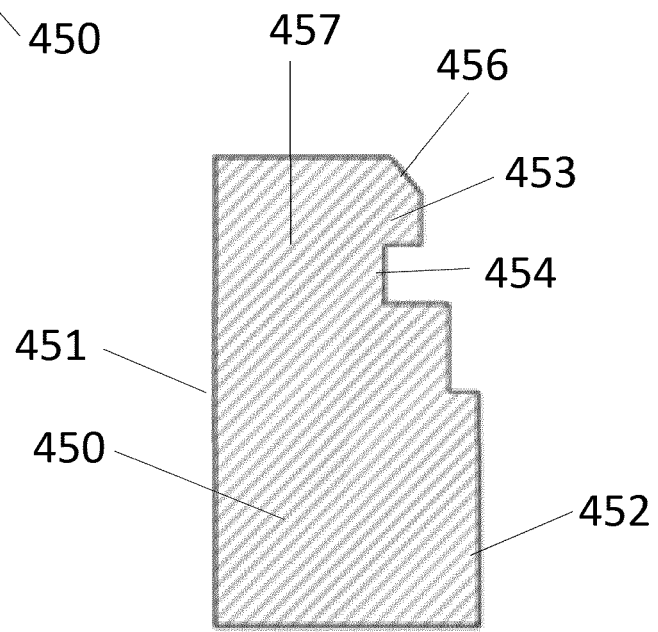
FIG. 13b shows a cross-section of a fifth locking unit of the present invention.

FIG. 13b shows a transverse cross-section through the fifth locking unit 450. The fifth locking unit 450 has a first surface 451. The first surface 451 of the fifth locking unit 450 is plain. The first surface 451 of the second locking unit 450 is suitable for being attached to a countertop 200, 300. The second surface 452 of the fifth locking unit 450 is profiled. The profile of the second surface 452 of the fifth locking unit 450 comprises a projection 453 and a recess 454. The projection 453 has a chamfered corner 456. The depth of the recess 454 may correspond to the depth of the sixth locking unit 460 in a compressed state. The depth of the recess 454 may correspond to the difference in depth of the sixth locking unit 460 in a compressed state and in an expanded state. The fifth locking unit 450 has an end portion 457.

A sixth locking unit is similar or identic to the third locking unit of FIG. 7a-c.

A second snap lock system 400 comprises the fourth, fifth and sixth locking units 440, 450, 460. The second snap lock system 400 may also comprise a lever mechanism 140 similar or identic to the lever mechanism of FIG. 9. The second snap lock system 400 is suitable for connecting perpendicularly adjoining countertops 200, 300.

Figure 14A:
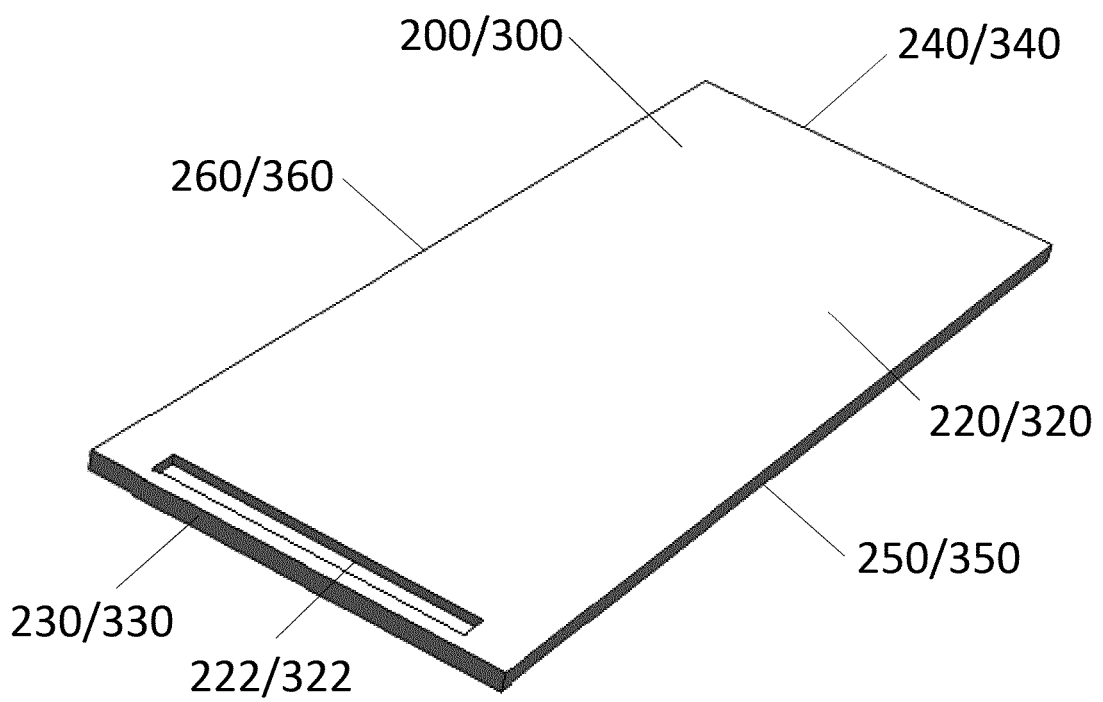
FIG. 14a shows a perspective view of an adapted countertop.

FIG. 14a shows a countertop 200, 300 with a first recess 222, 322. Instead of being provided at one of the side surfaces 230, 330, 240, 340, 250, 350, 260, 360, this recess 222, 322 is provided on the lower surface 220, 320 at a distance from one of said side surfaces. This countertop 200, 300 is suitable for being connected to a perpendicularly adjoining countertop 200, 300 by means of the second snap lock system 400. Said first recess 222, 322 is suitable for receiving the end portion 457 of the fifth locking unit 450.

Figure 14B:
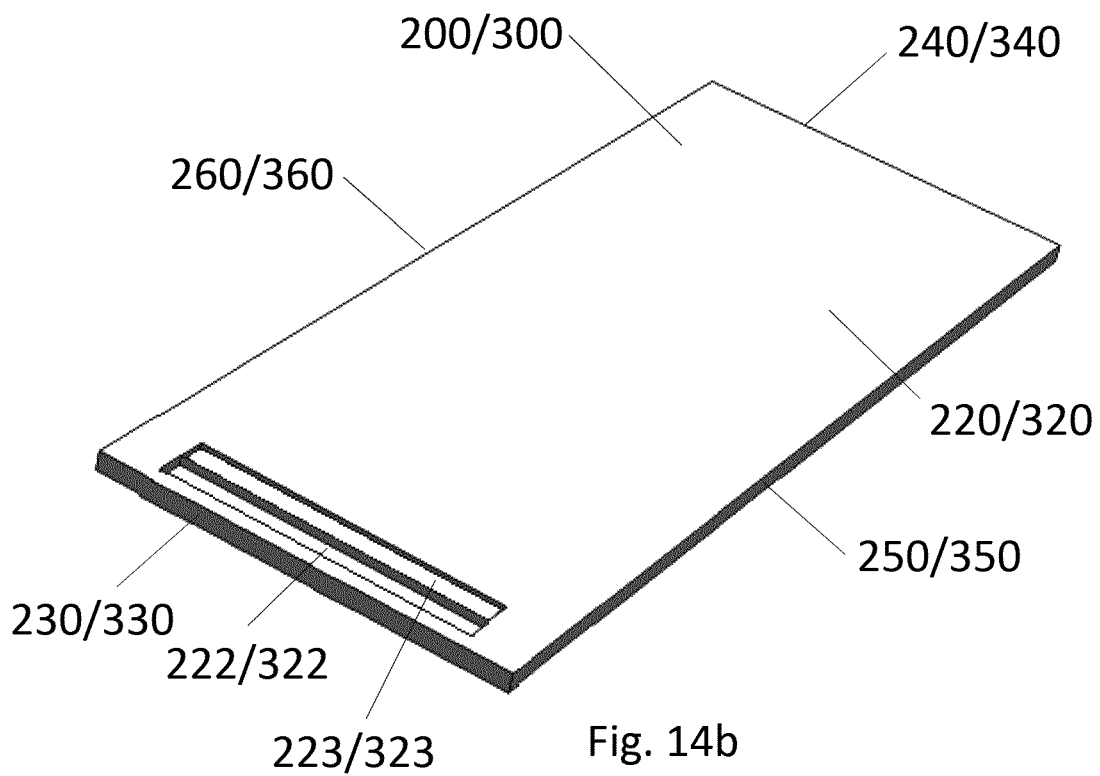
FIG. 14b shows a perspective view of an adapted countertop.

FIG. 14b shows a countertop 200, 300 with a first recess 222, 322 and an adjoining second recess 223, 323. Said first recess 222, 322 is deeper than said second recess 223, 323. Instead of being provided at one of the side surfaces 230, 330, 240, 340, 250, 350, 260, 360, these recesses 222, 322, 223, 323 are provided on the lower surface 220, 320 at a distance from one of said side surfaces. This countertop 200, 300 is suitable for being connected to a perpendicularly adjoining countertop 200, 300 by means of the second snap lock system 400. Said first recess 222, 322 is suitable for receiving the end portion 457 of the fifth locking unit 450. Said second recess 223, 323 is suitable for receiving the fourth locking unit 440.

FIG. 15a-d show cross-sections through two countertops 200, 300 perpendicularly connected by the second snap lock system 400. The fourth locking unit 440 is attached to the first countertop 200. The fifth locking unit 450 is attached to the second countertop 300. The sixth locking unit 460 is accommodated between the fourth and fifth locking units 440, 450 in a locking groove 463. In this connected state, the fourth, fifth and sixth locking units 440, 450, 460 are providing a connection preventing mutual vertical movement between the first and second countertops 200, 300. In this connected state, the fifth locking unit 450 and the first countertop 200 are providing a connection preventing mutual horizontal movement between the first and second countertops 200, 300.

Figure 15A:
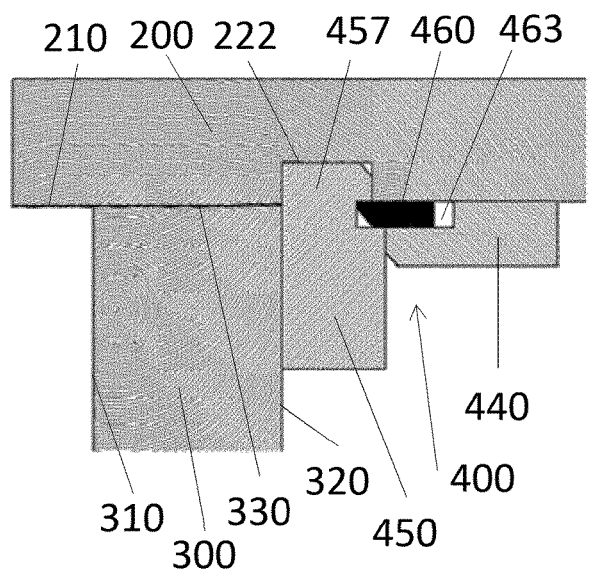
FIG. 15a shows a cross-section of two countertops perpendicularly connected by means of the present invention.

FIG. 15a particularly shows a first countertop 200 comprising a first recess 222, as illustrated in FIG. 14a and a second countertop 300 with plain upper and lower surfaces 310, 320. The lower surface of the first countertop 210 is tightly connected with one of the side surfaces 330, 340, 350 and 360 of the second countertop 300. The first countertop 200 protrudes from the second countertop 300. The length of said protrusion is determined by the distance from the first protrusion 222 to the side surface 230, 240, 250, 260 of the first countertop 200 relative to the thickness of the second countertop 300. The first recess 222 receives the end portion 457 of the fifth locking unit 450. The end portion 457 of the fifth locking unit 450 enters the first recess 222 of the first countertop 200 in a tight fit.

Figure 15B:
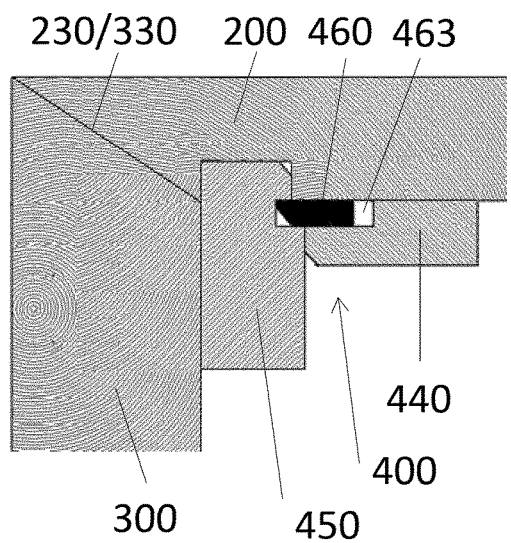
FIG. 15b shows a cross-section of two countertops perpendicularly connected by means of the present invention.

FIG. 15b particularly shows that two countertops 200, 300 with beveled side surfaces 230, 330, 240, 340, 250, 350, 260, 360 may be perpendicularly connected with the second snap lock system 400. Said beveled side surfaces being tightly connected.

Figure 15C:
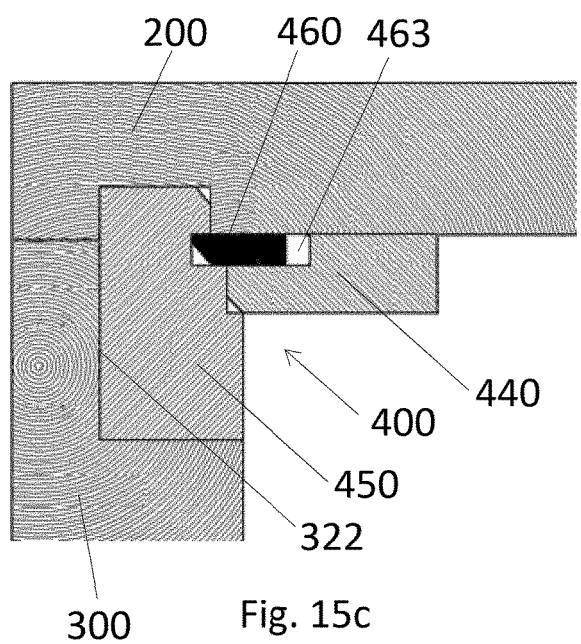
FIG. 15c shows a cross-section of two countertops perpendicularly connected by means of the present invention.

FIG. 15c particularly shows that two countertops 200, 300 may be connected without the first countertop 200 projecting from the second countertop 300. Further it shows that the second countertop 300 may be provided with a recess 322 in one of its side surfaces 330, 340, 350, 360, as illustrated in FIG. 10. The recess 322 of the second countertop 300 may be configured for receiving the fifth locking unit 450.

Figure 15D:
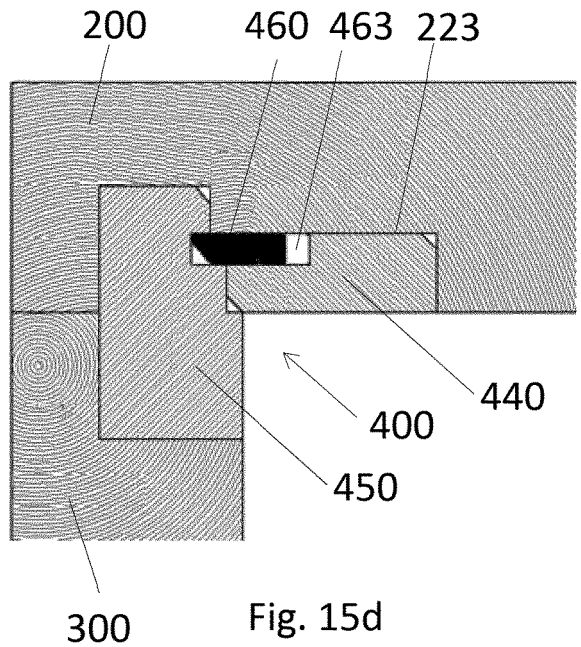
FIG. 15d shows a cross-section of two countertops perpendicularly connected by means of the present invention.

FIG. 15d particularly shows that the first countertop 200 may be provided with a second recess 223. The second recess 223 of the first countertop 200 may be configured for receiving the fourth locking unit 440.

Figure 15E:
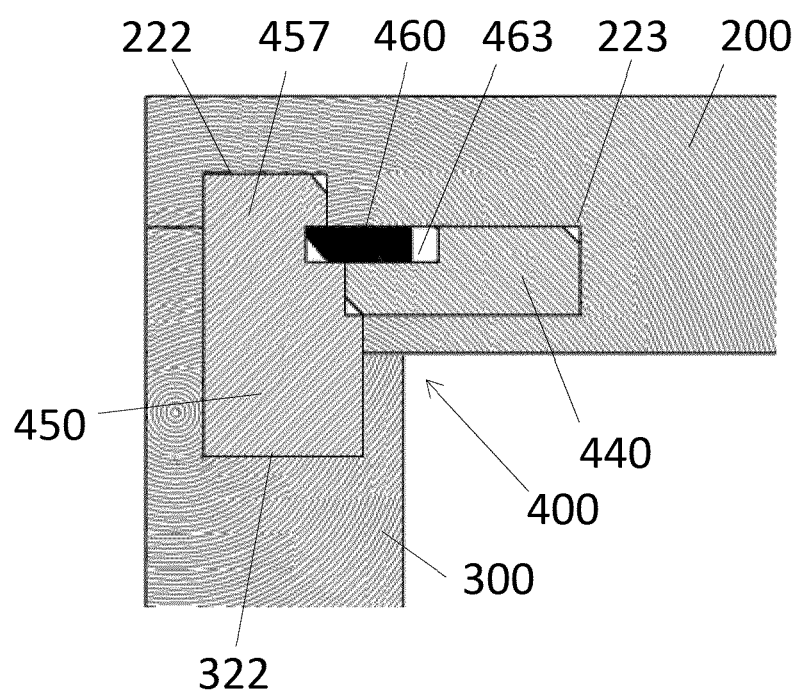
FIG. 15e shows a cross-section of two countertops perpendicularly connected by means of the present invention.

FIG. 15e particularly shows that the recesses 222, 223, 322 of the first and second countertops 200, 300 may be positioned in such a way that the snap lock system 400 is not visible from any side once the first and second countertops 200, 300 are connected. FIG. 15e shows that the two recesses 222, 223 of the first countertop 200 may be provided perpendicularly relative to each other.

For all the examples of FIG. a-e, the fifth locking unit 450 and the second countertop 300 is oriented vertically and the fourth locking unit 440 and the first countertop 200 is oriented horizontally.

The fourth locking unit 440 is aligned with the first countertop 200 before they are attached. The fourth locking unit 440 is aligned relative to the first recess 222 of the first countertop 200 in such a way that it doesn't obstruct the fifth locking unit 450 from entering said first recess 222. If a second recess 223 is provided in the first countertop 200, the fourth locking unit 440 may be aligned with and received by this second recess 223. The fourth locking unit 440 is aligned relative to the first recess 222 of the first countertop 200 in such a way that the recess 444 of the fourth locking unit 440 adjoins the recess 454 of the fifth locking unit 450, when connected.

The fifth locking unit 450 is aligned with the second countertop 300 before they are attached. The fifth locking unit 450 is aligned relative to the side surface 330 of the second countertop 300 in such a way that the end portion 457 protrudes from said side surface 330. If the second countertop 300 is provided with a recess 322, the fifth locking unit 450 may be aligned with and received by this recess 322. The fifth locking unit 450 is aligned relative to the side surface 330 of the second countertop 300 in such a way that the recess 454 of the fifth locking unit 450 adjoins that the recess 444 of the fourth locking unit 440, when connected.

When the fourth locking unit 440 is attached to the first countertop 200, the fifth locking unit 450 is attached to the second countertop 300, and the sixth locking unit 460 is arranged in the locking groove 463, the countertops 200, 300 can be connected. The second countertop 300 with the fifth locking unit 450 attached and the sixth locking unit 460 arranged therebetween can be positioned at the place of installation or in a test stand. Then the first countertop 200 with the fourth locking unit 440 attached can be vertically lowered into connection with the second countertop 300 with the fifth locking unit 450 attached. The first countertop 200 may be kept level or tilted during connection. When the chamfered corner 456 of the fifth locking unit 450 engages the chamfered longitudinal edge 462 of the sixth locking unit 460, the vertical movement will provide a horizontal force on the resilient member 461, causing the sixth locking unit 460 to shift into the compressed state. With the sixth locking unit 460 in the compressed state, the end portion 457 of the fifth locking unit 450 is allowed to enter the first recess 222 of the first countertop 200. When the end portion 457 of the fifth locking unit 450 has entered the first recess 222 of the first countertop 200, the recesses 444, 454 of the fourth and fifth locking units 440, 450 will align. When the recesses 444, 454 of the fourth and fifth locking units 440, 450 are aligned, the sixth locking unit 460 is allowed to shift back into its expanded state. The countertops 200, 300 are then connected. If the countertops 200, 300 and the fourth and fifth locking units 440, 450 are correctly aligned, the side surface 330 of the second countertop 300 will be tightly connected with the lower surface 210 of the first countertop 200. After entry into the connected state, the interfacing surfaces of the sixth locking unit 460 and the fifth locking unit 450 are both plain; thus, a horizontal force cannot be provided to the sixth locking unit 460 as a result of vertical movement of the fifth locking unit 450.

The sixth locking unit 460 may be oriented to engage the fourth locking unit 440 during connection, instead of the fifth locking unit 450.

The fourth locking unit 440 may have the same properties as the first locking unit 110. The fifth locking unit 450 may have the same properties as the second locking unit 120. The sixth locking unit may have the same properties as the third locking unit 130. The second snap lock system 400 may have the same properties as the first snap lock system 100.

Apart from the differences described, the second snap lock system 400 may be used in similar ways as the first snap lock system 100.

The invention claimed is:

1. A snap lock system for connecting adjoining horizontal countertops, wherein the system comprises:
    a first locking unit comprising a first surface referred to as 1A surface and an opposite second surface referred to as 1B surface, the 1B surface being attachable to a first countertop, and
    wherein the 1B surface has a profile comprising a projection, a first recess and a second recess;
    a second locking unit comprising a first surface referred to as 2A surface and an opposite second surface referred to as 2B surface, the 2B surface being attachable to a second countertop,
    wherein the 2A surface has a profile comprising a projection and a recess, and
    wherein the 2B surface comprises a recess; and
    a third locking unit comprising a resilient member and a chamfered longitudinal edge, accommodated in a locking groove defined by the second recess of the first locking unit and the recess of the second locking unit;
    wherein the profile of the 1B surface is configured to receive the profile of the 2A surface to provide a connection preventing mutual horizontal movement between the first and second locking units; and
    wherein, when the 1B surface is attached to the first countertop and the 2B surface is attached to the second countertop, during connection of the first locking unit and the second locking unit, the third locking unit is configured to allow vertical mating of the first locking unit and the second locking unit and, after connection, the third locking unit is configured to prevent mutual vertical movement between the first locking unit and the second locking unit.

2. The snap lock system according to claim 1, wherein each of the first locking unit, the second locking unit and the third locking unit are manufactured in single pieces.

3. The snap lock system according to claim 1, wherein the projection of the second locking unit comprises a chamfered corner.

4. The snap lock system according to claim 1, wherein the third locking unit is made of a polymer or a metal.

5. The snap lock system according to claim 1, wherein the first surface of the first locking unit is plain.

6. The snap lock system according to claim 1, wherein the snap lock system further comprises a lever mechanism comprising:
    a lever handle; and
    a lever wire connecting the lever handle to the third locking unit;
    wherein the lever mechanism is configured to retract the third locking unit to allow vertical movement between the first and second locking units after connection.

7. A countertop system comprising:
    a first countertop;
    a second countertop; and
    a snap lock system according to claim 1.

8. The countertop system according to claim 7, wherein each countertop comprises an upper surface, a lower surface and four side surfaces, and the first and second locking units are shorter than the side surfaces of the adjoining countertops which are in contact when the first and second locking units are connected.

9. The countertop system according to claim 7, wherein each countertop comprises a recess configured to receive the first and second locking units.

10. A method for connecting a first countertop with an adjoining second countertop by means of a snap lock system according to claim 1, wherein each countertop comprises an upper surface, a lower surface and four side surfaces,
    wherein the method comprises:
    aligning the first locking unit with the first countertop and the second locking unit with the second countertop in such a way that when the first locking unit and the second locking unit are connected, one of the side surfaces of the first countertop is in contact with one of the side surfaces of the second countertop;
    attaching the first locking unit to the first countertop in the aligned position and attaching the second locking unit to the second countertop in the aligned position;
    providing the third locking unit in the locking groove; and
    vertically connecting the first and second locking units.

11. The method according to claim 10, wherein the method further comprises:
    providing a recess on the first countertop, configured to receive the first locking unit; and
    providing a recess on the second countertop, configured to receive the second locking unit.

12. The method according to claim 11, wherein the method further comprises:
    dimensioning the recesses in such a way that they horizontally and/or vertically align the first and second locking units with their respective first and second countertops.

13. Use of a snap lock system according to claim 1 for connecting construction elements of a framework or a truss or panel boards.

14. Use of a snap lock system according to claim 1 for connecting board joints of furniture or steps.

15. A snap lock system for connecting perpendicularly adjoining countertops, wherein the system comprises:
    a fourth locking unit comprising a first surface referred to as 1A surface and an opposite second surface, referred to as 1B surface, the 1B surface being attachable to a first countertop, and
    wherein the 1B surface has a profile comprising a recess;
    a fifth locking unit comprising an end portion, a first surface referred to as 2A surface and an opposite second surface referred to as 2B surface,
    wherein the end portion is adapted to be received in a recess of the first countertop, the 2B surface has a profile comprising a recess, the 2A surface being attachable to a second countertop;
    a sixth locking unit comprising a resilient member and a chamfered longitudinal edge, accommodated in a locking groove defined by the the recess of the fourth locking unit and the recess of the fifth locking unit; and
    wherein the end portion of the fifth locking unit is configured to prevent mutual horizontal movement between the first countertop and the fifth locking unit, when received in the recess of the first countertop; and
    wherein, when the 1B surface is attached to the first countertop and the 2A surface is attached to the second countertop, during connection of the fourth locking unit and the fifth locking unit, the sixth locking unit is configured to allow vertical mating of the fourth locking unit and the fifth locking unit and, after connection, the sixth locking unit is configured to prevent mutual vertical movement between the fourth locking unit and the fifth locking unit.

16. The snap lock system according to claim 15, wherein each of the fourth locking unit, the fifth locking unit and the sixth locking unit are manufactured in single pieces.

17. The snap lock system according to claim 15, wherein the projection of the fifth locking unit comprises a chamfered corner.

18. The snap lock system according to claim 15, wherein the sixth locking unit is made of a polymer or a metal.

19. The snap lock system according to claim 15, wherein the first surface of the fourth locking unit is plain.

20. The snap lock system according to claim 15, wherein the snap lock system further comprises a lever mechanism comprising:
   a lever handle; and
   a lever wire connecting the lever handle to the sixth locking unit;
   wherein the lever mechanism is configured to retract the sixth locking unit to allow vertical movement between the fourth and fifth locking units after connection.

21. The countertop system according to claim 20, wherein each countertop comprises a recess configured to receive the fourth and fifth locking units.

22. A countertop system comprising:
   a first countertop;
   a second countertop; and
   a snap lock system according to claim 15.

23. The countertop system according to claim 22, wherein each countertop comprises an upper surface, a lower surface and four side surfaces, and the fourth and fifth locking units are shorter than the side surfaces of the adjoining countertops which are in contact when the fourth and fifth locking units are connected.

24. A method for connecting a first countertop with an adjoining second countertop by means of a snap lock system according to claim 15, wherein each countertop comprises an upper surface, a lower surface and four side surfaces, wherein the method comprises:
   aligning the fourth locking unit with the first countertop and the fifth locking unit with the second countertop in such a way that when the fourth locking unit and the fifth locking unit are connected, the lower surface of the first countertop is in contact with one of the side surfaces of the second countertop;
   attaching the fourth locking unit to the first countertop in the aligned position and attaching the fifth locking unit to the second countertop in the aligned position;
   providing the sixth locking unit in the locking groove; and
   vertically connecting the fourth and fifth locking units.

25. The method according to claim 24, wherein the method further comprises:
   providing a recess on the first countertop, configured to receive the fourth locking unit; and
   providing a recess on the second countertop, configured to receive the fifth locking unit.

26. The method according to claims 25, wherein the method further comprises:
   dimensioning the recesses in such a way that they horizontally and/or vertically align the fourth and fifth locking units with their respective first and second countertops.

27. Use of a snap lock system according to claim 15 for connecting construction elements of a framework or a truss or panel boards.

28. Use of a snap lock system according to claim 15 for connecting board joints of furniture or steps.

* * * * *